US008885776B2

(12) United States Patent
Ozgur

(10) Patent No.: US 8,885,776 B2
(45) Date of Patent: *Nov. 11, 2014

(54) SYMBOL ERROR DETECTION FOR BLUETOOTH ENHANCED DATA RATE PACKETS

(71) Applicant: QUALCOMM Incorporated, San Diego, CA (US)

(72) Inventor: Soner Ozgur, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/770,491

(22) Filed: Feb. 19, 2013

(65) Prior Publication Data

US 2013/0163655 A1 Jun. 27, 2013

Related U.S. Application Data

(63) Continuation of application No. 12/779,209, filed on May 13, 2010, now Pat. No. 8,401,120.

(51) Int. Cl.
*H03D 3/22* (2006.01)
*H04L 1/00* (2006.01)

(52) U.S. Cl.
CPC ............. *H01L 1/00* (2013.01); *H04L 1/0061* (2013.01)
USPC ........... 375/329; 375/331; 375/332; 375/340; 375/373; 375/376

(58) Field of Classification Search
CPC . H04L 7/0029; H04L 1/00; H04L 2027/0067; H04L 2027/0057; H04L 27/3872; H04L 2027/0065; H04L 27/3221; H03L 7/091
USPC .................. 375/329, 331, 332, 340, 373, 376
See application file for complete search history.

(56) References Cited

U.S. PATENT DOCUMENTS

| 4,644,562 A | 2/1987 | Kavehrad et al. |
| 5,241,567 A | 8/1993 | Shimakata |
| 5,301,210 A | 4/1994 | Vandamme et al. |
| 5,550,506 A | 8/1996 | Tsumura |

(Continued)

OTHER PUBLICATIONS

Bluetooth Core Specification v3.0 + HS—Procedures for Flow Control and Retransmission, vol. 3, Part A. Section 8 http://WWW.bluetooth.comlEnglish/Technology/Building/PagesiSpecification_aspx Obtained from internet on Dec. 28, 2010, pp. 130-176.

(Continued)

*Primary Examiner* — Kabir A Timory
(74) *Attorney, Agent, or Firm* — DeLizio Gilliam, PLLC

(57) ABSTRACT

A symbol error detector can be configured to detect symbol errors of a Bluetooth enhanced data rate (EDR) packet without relying solely on a CRC error detection mechanism. After a phase of a current symbol is demodulated to determine a demodulated current symbol, the phase of the demodulated current symbol can be subtracted from the phase of the current symbol prior to demodulation to yield a phase error. The phase error can be compared against a phase error threshold to determine a potential unreliability of the demodulated current symbol. The phase error being greater than the phase error threshold can indicate that the demodulated current symbol may be unreliable. Accordingly, a symbol error notification can be generated to indicate that the demodulated current symbol may be unreliable.

39 Claims, 6 Drawing Sheets

(56) References Cited

U.S. PATENT DOCUMENTS

| | | | |
|---|---|---|---|
| 5,928,379 | A | 7/1999 | Hattori |
| 6,018,544 | A | 1/2000 | Kotzin et al. |
| 6,859,504 | B1 | 2/2005 | Kowalski |
| 6,904,098 | B1 | 6/2005 | Isaksen et al. |
| 7,756,082 | B1 | 7/2010 | Dhamdhere |
| 7,970,920 | B1 | 6/2011 | Dinan |
| 8,401,120 | B1 | 3/2013 | Ozgur |
| 8,401,121 | B1 | 3/2013 | Ozgur |
| 2002/0118665 | A1 | 8/2002 | Cleveland et al. |
| 2003/0045333 | A1 | 3/2003 | Kimata et al. |
| 2003/0058036 | A1 | 3/2003 | Stillman et al. |
| 2003/0083834 | A1* | 5/2003 | Little et al. ............ 702/69 |
| 2005/0008101 | A1* | 1/2005 | Kazi et al. ............ 375/330 |
| 2005/0039103 | A1 | 2/2005 | Azenko et al. |
| 2005/0097409 | A1 | 5/2005 | Shin et al. |
| 2005/0111485 | A1 | 5/2005 | Bruckmann et al. |
| 2009/0130989 | A1* | 5/2009 | Rousu et al. ............ 455/73 |
| 2009/0147732 | A1 | 6/2009 | Tsao |
| 2010/0067401 | A1 | 3/2010 | Medvedev et al. |
| 2011/0289379 | A1 | 11/2011 | Uhlemann |
| 2013/0156132 | A1 | 6/2013 | Ozgur |
| 2013/0163655 | A1 | 6/2013 | Ozgur |

OTHER PUBLICATIONS

Co-Pending U.S. Appl. No. 12/719,978, filed Mar. 9, 2010, 43 pages.
Co-pending U.S. Appl. No. 13/769,032, filed Feb. 15, 2013, 46 pages.
"U.S. Appl. No. 13/769,032 Office Action", Jun. 21, 2013, 5 pages.
"U.S. Appl. No. 12/719,978 Final Office Action", Dec. 24, 2012, 23 pages.
"U.S. Appl. No. 12/719,978 Office Action", Apr. 25, 2012, 20 pages.
"U.S. Appl. No. 12/779,208 Office Action", Jul. 13, 2012, 7 pages.
"U.S. Appl. No. 12/779,209 Office Action", Jul. 5, 2012, 7 pages.

* cited by examiner

SYMBOL ERROR DETECTION FOR BLUETOOTH ENHANCED DATA RATE PACKETS

RELATED APPLICATIONS

This application is a continuation of U.S. application Ser. No. 12/779,209 filed May 13, 2010.

BACKGROUND

Embodiments of the inventive subject matter generally relate to the field of wireless communication and, more particularly, to symbol error detection for Bluetooth® enhanced data rate (EDR) packets.

Bluetooth EDR packets are modulated using a combination of a Gaussian frequency shift keying (GFSK) modulation scheme and a differential encoded phase shift keying (DPSK) modulation scheme. GFSK is used to modulate a header of the Bluetooth EDR packets, while either a π/4 rotated differential encoded quadrature PSK (π/4-DQPSK) modulation scheme or an 8-DPSK modulation scheme is used to modulate a payload of the Bluetooth EDR packets.

SUMMARY

Various embodiments for detecting symbol errors in a Bluetooth EDR packet are disclosed. In one embodiment, a phase of a first symbol of a received signal is determined at a wireless network device. It is determined that the phase of the first symbol is within a predetermined threshold of a predefined phase associated with a corresponding predefined symbol. A phase error that indicates a difference between the phase of the first symbol of the received signal and the predefined phase is determined. The phase error is compared against a predetermined phase error threshold. It is determined whether to generate a symbol error notification based on comparing the phase error against the predetermined phase error threshold.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
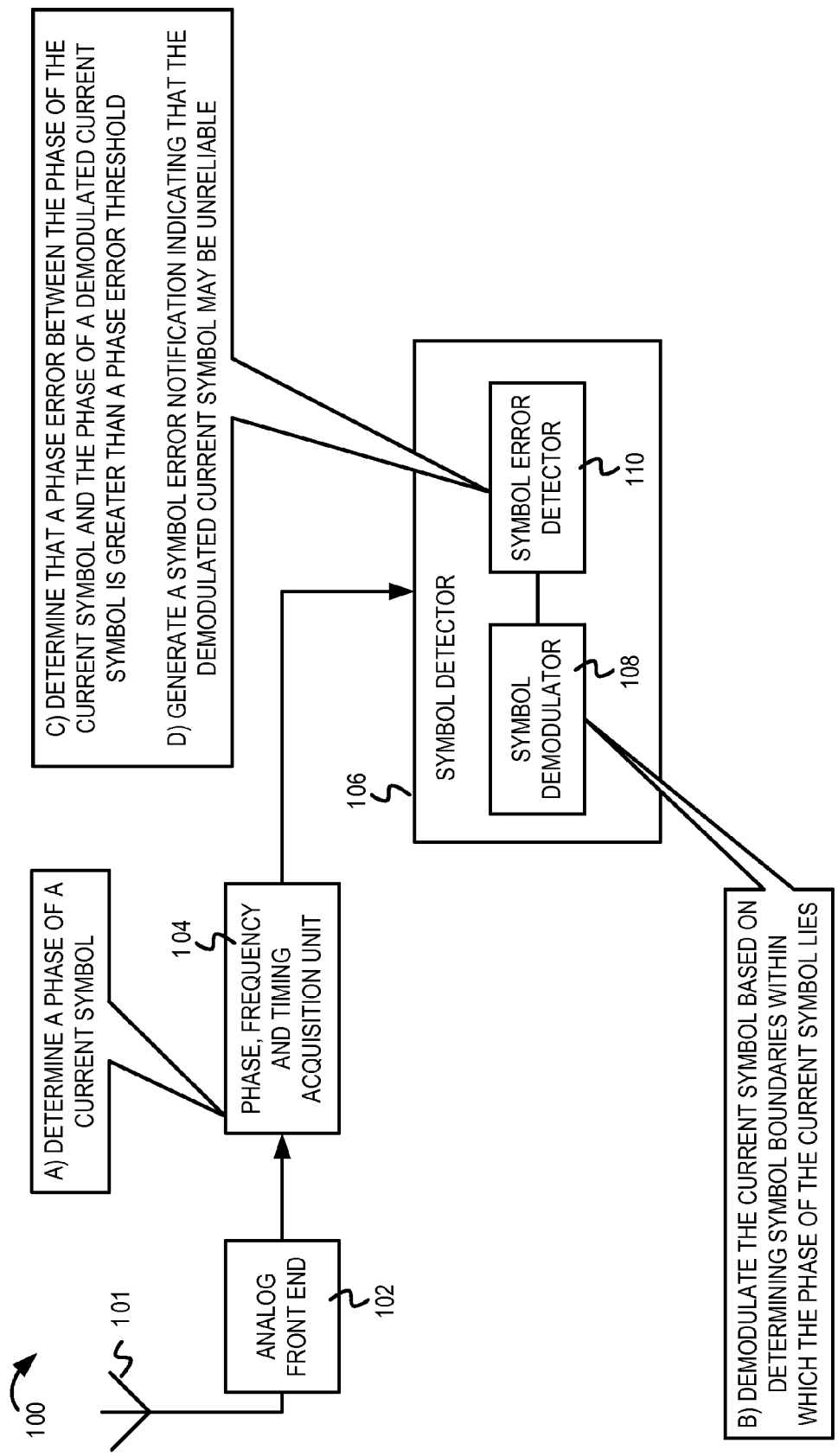
FIG. 1 is an example block diagram illustrating a Bluetooth receiver implementing a symbol error detection mechanism for Bluetooth EDR packets.

The description that follows includes exemplary systems, methods, techniques, instruction sequences, and computer program products that embody techniques of the present inventive subject matter. However, it is understood that the described embodiments may be practiced without these specific details. For instance, although examples refer to symbol error detection for Bluetooth EDR packets, embodiments are not so limited. In some implementations, other communication standards and devices (e.g., wireless local area network (WLAN) 802.11 standards) that implement a PSK modulation scheme may also implement the symbol error detection mechanism described herein. In other instances, well-known instruction instances, protocols, structures, and techniques have not been shown in detail in order not to obfuscate the description.

In a Bluetooth EDR packet, the length of the payload of the Bluetooth EDR packet is transmitted as part of the payload. An error in determining the length of the payload of the Bluetooth EDR packet can cause a Bluetooth receiver to incorrectly receive/interpret various data fields of the Bluetooth EDR packet, thus resulting in data corruption. The Bluetooth receiver typically implements a cyclic redundancy check (CRC) error detection mechanism to detect symbol errors in the payload of the Bluetooth EDR packet. However, the CRC error detection mechanism may not be sufficient to detect symbol errors in large data transfers. For example, the probability of receiving a corrupted payload in the Bluetooth EDR packet and a CRC-16 error detection mechanism not detecting the corrupted payload can be approximately 1.5 E-5. Thus, there is a relatively high probability that the CRC error detection mechanism may not detect incorrectly demodulated symbols of the Bluetooth EDR packet. Consequently, the CRC error detection mechanism may allow the Bluetooth EDR packet to be provided to upper protocol layers (e.g., a Bluetooth link controller) for subsequent processing, resulting in data corruption.

A symbol error detector can be implemented in the Bluetooth receiver to analyze Bluetooth EDR packets and to detect symbol errors that may be overlooked by, or that may pass undetected through, the CRC error detection mechanism. When a symbol of a Bluetooth EDR packet is received at the Bluetooth receiver, the symbol error detector can compare the phase of the symbol as received (i.e., phase of the symbol prior to demodulation) to a predefined symbol phase to which the received symbol was demodulated (i.e., phase of the symbol after demodulation) to calculate a phase error. The symbol error detector can compare the phase error to a predetermined threshold and can indicate potential unreliability of the demodulated symbol if the phase error is greater than the predetermined threshold. Comparing the phase error against the predetermined threshold serves as an indication of the proximity of the received symbol to a symbol boundary between two predefined symbol phases. In other words, the phase error being greater than the predetermined threshold indicates that the phase of the received symbol is so close to the symbol boundary between two predefined symbol phases that the probability that the received symbol was erroneously demodulated is high. The symbol error detector operates on a symbol-by-symbol basis, thus allowing interferences that last for a very short time (e.g., 1 microsecond) to be detected. The symbol error detector can also allow for adaptation between different modulation schemes supported by Bluetooth EDR protocols (e.g., 8-DPSK and π/4 DQPSK modulation schemes) by configuring programmable parameters. The symbol error detector can enable the Bluetooth receiver to achieve a high symbol error detection rate and a low false alarm rate. The symbol error detector can also improve reliability of received Bluetooth EDR packets.

FIG. 1 is an example block diagram illustrating a Bluetooth receiver 100 implementing a symbol error detection mechanism for Bluetooth EDR packets. The Bluetooth receiver 100 comprises an antenna 101 and an analog front end 102. The analog front end 102 is coupled to a phase, frequency, and timing acquisition unit 104 which, in turn, is coupled to a symbol detector 106. The symbol detector 106 comprises a symbol demodulator 108 coupled to a symbol error detector 110.

Figure 2:
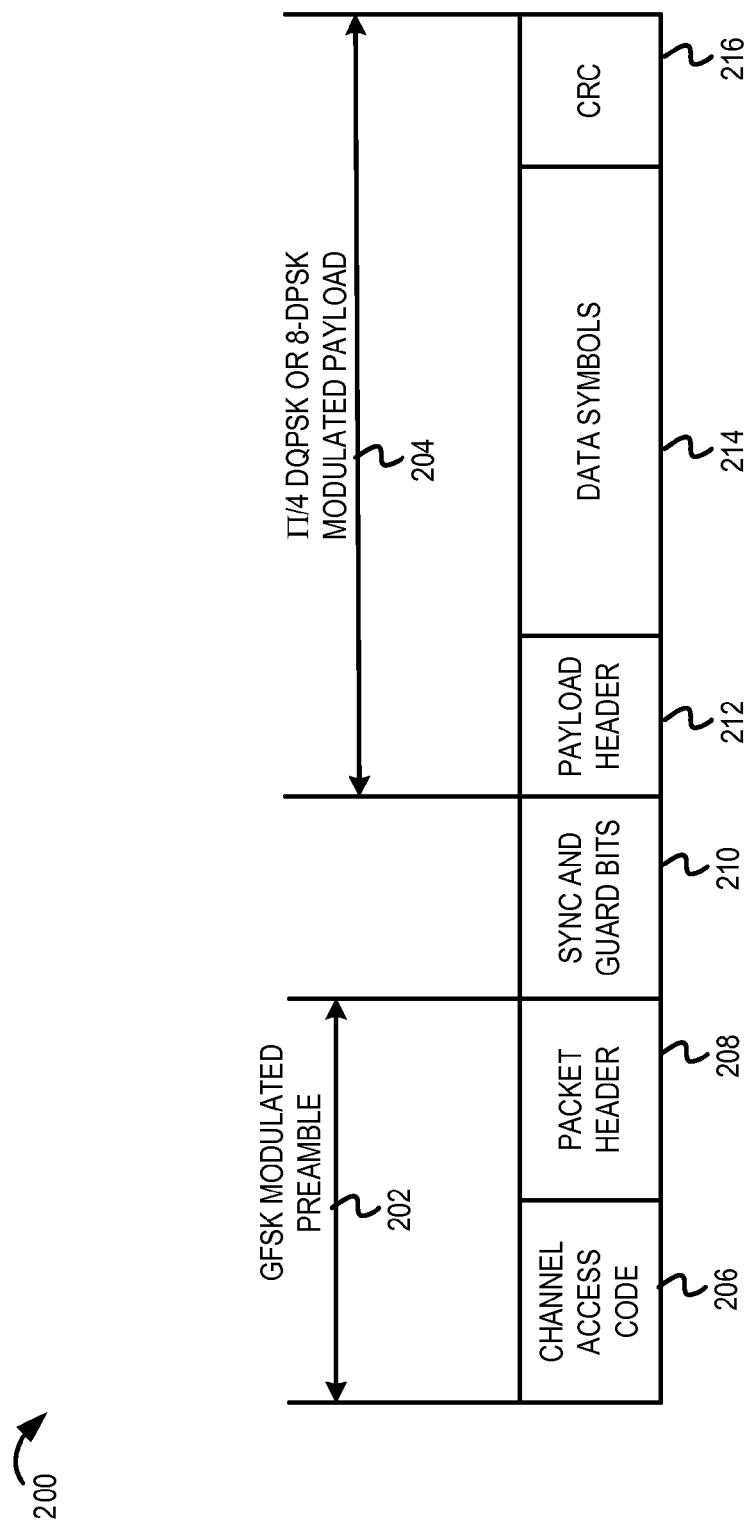
FIG. 2 illustrates an example format of a Bluetooth EDR packet.

At the Bluetooth receiver 100, the antenna 101 receives an RF signal and provides the received RF signal to the analog front end 102. The received RF signal comprises a Bluetooth EDR packet. FIG. 2 illustrates an example format of the Bluetooth EDR packet 200. The Bluetooth EDR packet 200 comprises a Gaussian frequency shift keying (GFSK) modulated preamble 202 and a differential encoded phase shift keying (DPSK) modulated payload 204. The payload 204 may be modulated using either a $\pi/4$ rotated differential encoded quadrature phase shift keying ($\pi/4$ DQPSK) modulation scheme or an 8-phase differential encoded phase shift keying (8-DPSK) modulation scheme. The preamble 202 can comprise a channel access code 206 and a packet header 208. The channel access code 206 may be used for synchronization, DC-offset compensation, packet identification, paging and inquiry operations, etc. The packet header 208 can comprise link control information that identifies the type of Bluetooth packet being transmitted (e.g., asynchronous connectionless link (ACL) packet, synchronous connection oriented (SCO) packet, etc.), information about the payload 204, a transmitting and a destination wireless network devices, etc. Following the packet header 208, the Bluetooth EDR packet comprises sync and guard bits 210. The guard bits allow the Bluetooth receiver 100 to prepare for the switch in modulation schemes (from the GFSK modulated preamble 202 to the DPSK modulated payload 204). The synchronization bits can allow the Bluetooth receiver 100 to synchronize symbol timing and phase for either the $\pi/4$ DQPSK or 8-DPSK modulation schemes that may be used to modulate the payload 204 of the Bluetooth EDR packet 200. The payload 204 can comprise a payload header 212 that indicates the length of the Bluetooth EDR packet 200. The payload 204 also comprises data symbols 214 (e.g., data from applications, user data, etc.). The payload 204 may also comprise additional information (e.g., cyclic redundancy check (CRC) 216) to enable error detection in the Bluetooth EDR packet 200.

Referring back to FIG. 1, the analog front end 102, that receives the RF signal comprising the Bluetooth EDR packet, can include 1) one or more amplifying stages to amplify the received RF signal, 2) one or more filtering stages to remove unwanted bands of frequencies, 3) mixer stages to down-convert the received RF signal, 4) an automatic gain control (AGC) unit to adjust the gain to an appropriate level for a range of received signal amplitude levels, 5) an analog to digital converter (ADC) to convert the received RF signal into a digital signal, etc. It is noted that the Bluetooth receiver 100 can comprise addition components not depicted in FIG. 1. For example, the Bluetooth receiver 100 can comprise a decimating filter coupled to the ADC to reduce the sampling rate, filter a noise signal from the received RF signal, etc.

After initial processing by the analog front end 102 and other digital processing units, the payload of the Bluetooth EDR packet is provided to the phase, frequency, and timing acquisition unit 104. The phase, frequency, and timing acquisition unit 104 can comprise a coordinate rotation digital computer (CORDIC) that calculates a magnitude and phase of the Bluetooth EDR packet. The phase, frequency, and timing acquisition unit 104 can use the magnitude and the phase of the Bluetooth EDR packet for timing acquisition and tracking. The phase, frequency, and timing acquisition unit 104 can also use the phase of the Bluetooth EDR packet for frequency and phase acquisition. Frequency offset determined based on analyzing the GFSK modulated preamble of the Bluetooth EDR packet can also be utilized by the phase, frequency, and timing acquisition unit 104 in performing frequency and phase acquisition.

The data symbols that constitute the payload of the Bluetooth EDR packet are represented by phase variations in the received RF signal. Thus, the phase of the received RF signal varies during a time interval that corresponds to a current symbol. Because the payload is modulated using a DPSK modulation scheme, the variation in phase depends on the current symbol and on a preceding symbol. At stage A, the phase, frequency, and timing acquisition unit 104 determines the phase of the received RF signal during a time interval that corresponds to the current symbol ("phase of the current received symbol") and provides the phase of the current received symbol to the symbol detector 106. In some implementations, the phase, frequency, and timing, acquisition unit 104 may provide the phase of the current received symbol to a decimating filter before providing the decimated phase of the current received symbol to the symbol detector 106.

At stage B, the symbol demodulator 108 in the symbol detector 106 demodulates the current symbol based on determining symbol boundaries within which the phase of the current received symbol lies. As described above, the payload of the Bluetooth EDR packet is modulated using 8-DPSK or $\pi/4$-DQPSK. PSK uses a finite number of predefined symbol phases and each predefined symbol phase is associated with a unique symbol. For example, QPSK and its variants use four predefined symbols, each symbol comprising two bits (i.e., 00, 10, 11, and 01), to encode data bits that are scheduled to be transmitted (i.e., a data stream). Each of the four predefined symbols is associated with a predefined symbol phase. For example, the symbols 00, 10, 11, and 01 may be associated with phases 0, $\pi/4$, 3 $\pi/4$, and $-\pi/4$, respectively. The predefined symbols can be represented on a constellation map by their corresponding phases. $\pi/4$-QPSK uses two identical constellations, which are rotated by $\pi/4$ with respect to each other. For example, one constellation might associate the symbols 00, 10, 11, and 01 with phases 0, $\pi/2$, 3 $\pi/2$, and $-\pi/2$, respectively, while the other constellation might associate the symbols 00, 10, 11, and 01 with respective phases $\pi/4$, 3 $\pi/4$, $-\pi 3\pi/4$, and $-\pi/4$, respectively. In some implementations, even symbols of the data stream are encoded using pre-defined phases from one constellation and odd symbols of the data stream are encoded using pre-defined phases from the other constellation. $\pi/4$-DQPSK can be used to modulate the payload of the Bluetooth EDR packet and indicates the phase of the current symbol with reference to the phase of a preceding symbol. For example, the symbols 00, 10, 11, and 01 may be indicated by respectively transmitting a phase shift of 0, $\pi/2$, 3 $\pi/2$, and $-\pi/2$ with respect to the preceding symbol.

Figure 3:
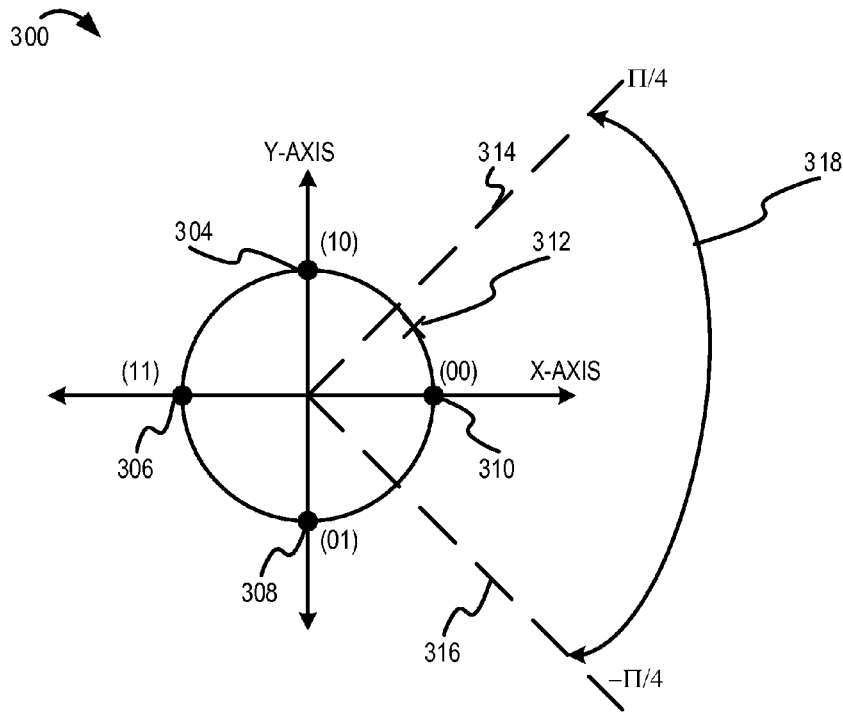
FIG. 3 illustrates constellation diagram illustrating demodulating a received symbol and detecting symbol errors for a π/4 DQPSK modulation scheme.
Figure 3:
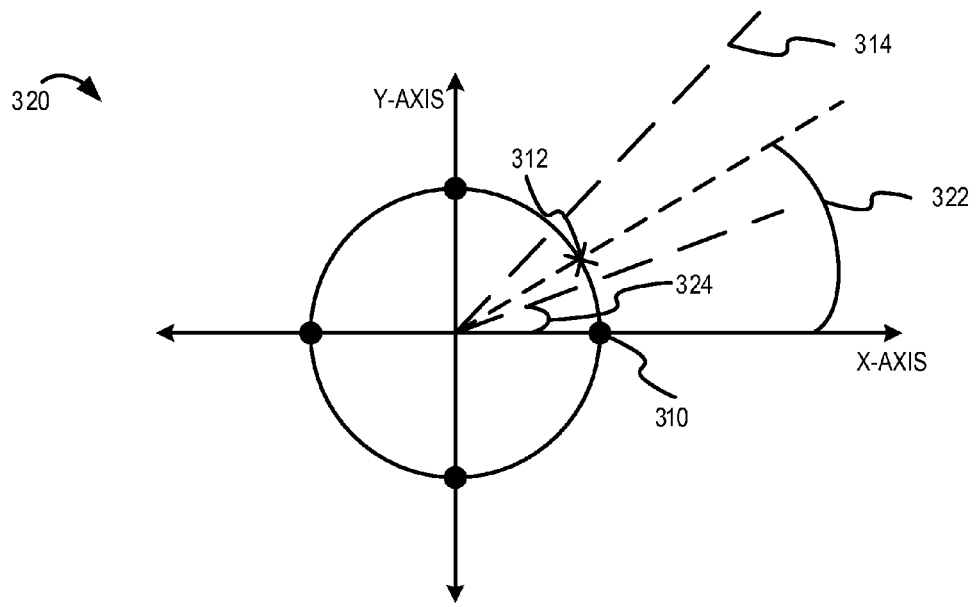

The symbol demodulator 108 can demodulate a DPSK modulated signal by demodulating each received symbol to one of the predefined symbol phases. For example, a $\pi/4$-DQPSK modulated signal can be demodulated by demodulating each received symbol to one of the four predefined symbol phases. Constellation diagram 300 of FIG. 3 illustrates one example of the predefined symbol phases for a $\pi/4$ DQPSK modulation scheme. The constellation diagram 300 depicts the predefined symbol phases after $\pi/4$ correction. In the constellation diagram 300, symbol 00 (symbol 310) is represented by a predefined phase of 0, symbol 01 (symbol 308) is represented by a predefined phase of $-\pi/2$, symbol 11

(symbol 306) is represented by a predefined phase of π, and symbol 10 (symbol 304) is represented by a predefined phase of π/2. It is noted that the symbol detector 106 can be either a coherent symbol detector or a non-coherent symbol detector.

The symbol demodulator 108 maps the phase of the current symbol 312 to one of the predefined symbol phases associated with the symbols 304, 306, 308, and 310 by determining symbol boundaries within which the phase of the current symbol 312 lies. For π/4-DQPSK modulated signals (after π/4 correction), the symbol boundaries lie at odd multiples of π/4. In the constellation diagram 300, symbol boundary 314 (at an angle of π/4) and symbol boundary 316 (at an angle of −π/4) are associated with the symbol 310. Thus, the current symbol 312 will be demodulated and decoded to the predefined symbol 310 (i.e., symbol 00) if the phase of the current symbol 312 lies within a phase angle 318 constrained by the symbol boundaries 314 and 316. As depicted by the constellation diagram 300, the phase of the current symbol 312 lies within the phase angle 318 constrained by the symbol boundaries 314 and 316 associated with the symbol 310. Therefore, the symbol demodulator 108 maps the current symbol 312 to the predefined symbol 310. The current symbol after demodulation is herein referred to as a demodulated current symbol. The phase of the demodulated current symbol is equivalent to the phase of the predefined symbol 310 to which the current symbol 312 was mapped. In this example, the demodulated current symbol has a phase of 0.

Referring back to FIG. 1, at stage C, the symbol error detector 110 determines that a phase error between the phase of the current symbol and the phase of the demodulated current symbol is greater than a phase error threshold. This is illustrated in constellation diagram 320 of FIG. 3. The symbol error detector 110 calculates the phase error 322 between the phase of the current symbol 312 (as received prior to demodulation) and the phase of the demodulated current symbol 310 (i.e., one of the predefined symbol phases to which the phase of the current symbol was mapped). The symbol error detector 110 compares the phase error 322 against a phase error threshold 324. In some implementations, the symbol error detector 110 can determine an absolute value of the phase error 322 and can compare the absolute value of the phase error 322 against the phase error threshold 324. As depicted in the constellation diagram 320, the phase error threshold 324 may be chosen to impose a tighter constraint as compared to the symbol boundary 314. The symbol demodulator 108 maps the current symbol 312 to the symbol 310 if the phase of the current symbol 312 lies within the symbol boundary 314 associated with the symbol 310. However, in this example, the symbol error detector 110 determines the current symbol 312 is unreliable because the phase of the current symbol 312 lies outside boundaries imposed by the phase error threshold 324. Thus, the phase error 322 being greater than the phase error threshold 324 indicates that the phase of the current symbol 312 is relatively close to the symbol boundary 314 between the symbol 310 and the symbol 304. The symbol error detector 110 may consider the current symbol 312 as unreliable if it is relatively close to the symbol boundary 314 because it may not reliably decode the current symbol 312 to either the symbol 310 or the symbol 304.

At stage D, the symbol error detector 110 generates a symbol error notification indicating that the demodulated current symbol may be unreliable. The symbol error detector 110 can generate the symbol error notification if the symbol error detector 110 determines that the phase error 322 in greater than the phase error threshold 324. In one implementation, the symbol error detector 110 may provide the symbol error notification to a Bluetooth link controller (or other symbol processing unit). On receiving the symbol error notification, the Bluetooth link controller can discard the demodulated current symbol and the Bluetooth EDR packet. The Bluetooth link controller can also request a transmitting Bluetooth device to retransmit the Bluetooth EDR packet. In another implementation, the symbol error detector 110 may provide the symbol error notification to the symbol demodulator 108. In response to receiving the symbol error notification, the symbol demodulator 108 may not provide the demodulated current symbol to the Bluetooth link controller. In some implementations, the symbol error detector 110 may generate the symbol error notification if a number of symbols between the demodulated current symbol and a previously detected symbol error is greater than an error length threshold, as will be further described below with reference to FIG. 5. In other implementations, the symbol error detector 110 may generate the symbol error notification irrespective of the number of symbols between the demodulated current symbol and the previously detected symbol error.

Figure 4:
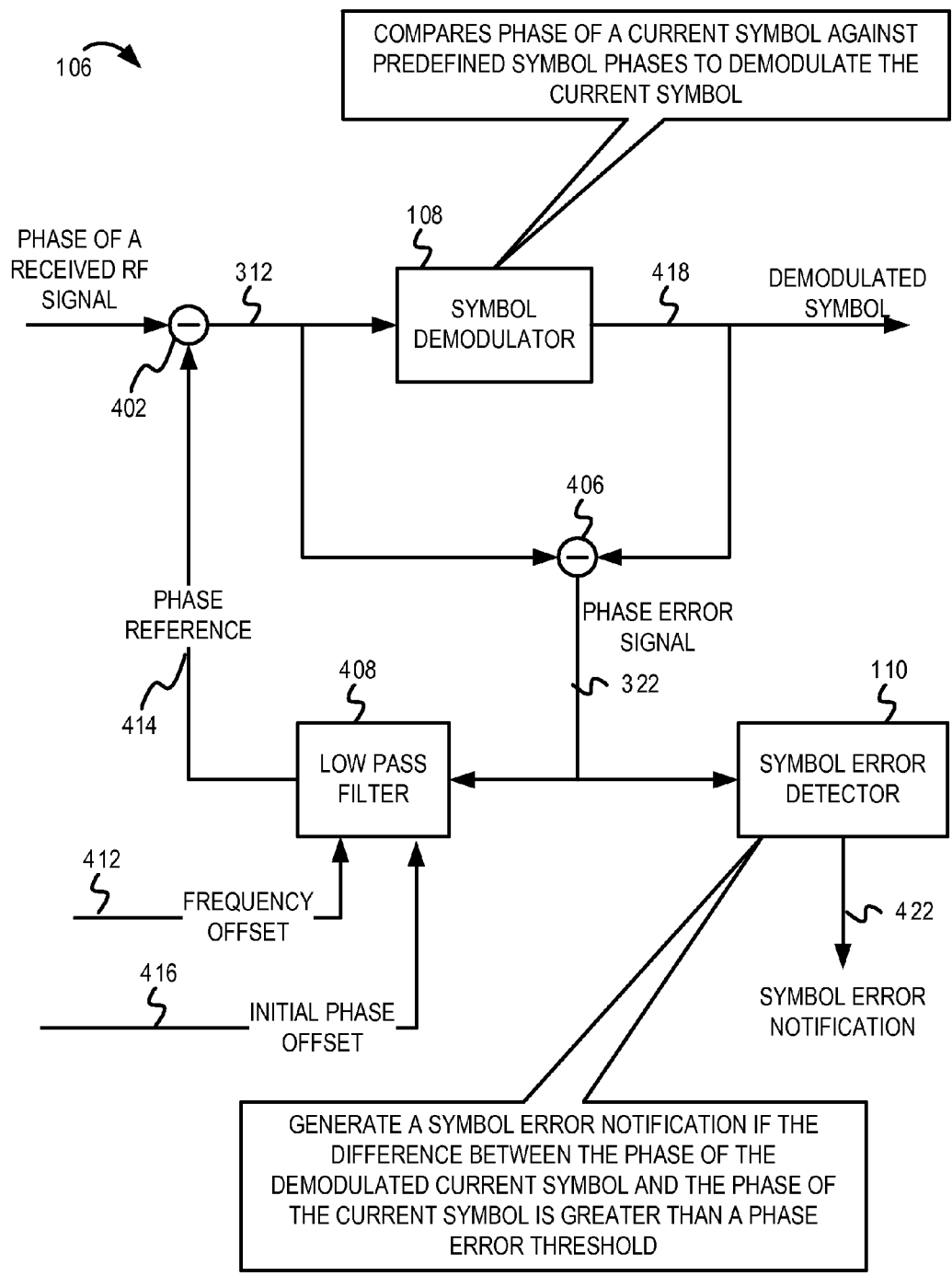
FIG. 4 is an example block diagram depicting the symbol detector configured to detect symbol errors in a Bluetooth EDR packet.

FIG. 4 is an example block diagram depicting the symbol detector 106 configured to detect symbol errors in a Bluetooth EDR packet. The symbol detector 106 comprises the symbol demodulator 108, subtractors 402 and 406, a low pass filter 408, and the symbol error detector 110. The subtractor 402 receives as inputs a phase of a received RF signal during a time interval that corresponds to a current symbol and a phase reference 414 generated by the low pass filter 408. The output signal generated by the subtractor 402 represents the phase of the current symbol and is provided as an input signal to the symbol demodulator 108. The input signal to the symbol demodulator 108 and the output signal generated by the symbol demodulator 108 are provided to the subtractor 406. The output of the subtractor 406 is provided to the symbol error detector 110 and to the low pass filter 408. The low pass filter 408 also receives, as inputs, a frequency offset 412 and an initial phase offset 416. Accordingly, the low pass filter 408 generates and varies the phase reference 414.

The low pass filter 408 enables tracking of variations in phase, frequency, or other derivatives of the phase of the current symbol 312. The low pass filter 408 generates the phase reference 414 that enables the symbol demodulator 108 to lock onto the phase of the current symbol 312 and to decode the current symbol accurately. The phase reference 414 is initially determined based on knowledge of the frequency offset 412 and the initial phase offset 416 (e.g., calculated by the phase, frequency, and timing acquisition unit 104 as part of processing the packet header 208). The input to the symbol detector 106 is a phase of the received RF signal during the time interval that corresponds to the current symbol. The subtractor 402 subtracts the phase reference 414 from the input phase to compensate for phase and frequency offsets (e.g., frequency drifts, phase imperfections and offsets, etc.) and to yield the phase of the current symbol 312. In one implementation, the subtractor 402 and the low pass filter 408 may be implemented as part of the phase, frequency, and timing acquisition unit 104 of FIG. 1.

The phase of the current symbol 312 is provided to the symbol demodulator 108, which demodulates the current symbol based on comparing the phase of the current symbol 312 against one or more pre-defined symbol phases. As described above, each of the pre-defined symbol phases is associated with a corresponding predefined symbol. Also, each of the predefined symbol phases is associated with symbol boundaries. For example, as depicted in the constellation diagram 300, the predefined symbol 310 has a predefined symbol phase of 0 and symbol boundaries at a phase of π/4 and −π/4. The symbol demodulator 108 can map the phase of the current symbol 312 to one of the predefined symbol phases to yield a demodulated current symbol based on identifying the symbol boundaries within which the phase of the current symbol 312 lies. As depicted in FIG. 3, the symbol demodulator 108 maps the phase of the current symbol 312 to the phase of the predefined symbol 310 based on determining that the phase of the current symbol 312 lies within symbol boundaries 314 and 316 associated with the symbol 310. In other words, the symbol demodulator 108 identifies one of the predefined symbol phases that is closest to the phase of the current symbol and designates the predefined symbol associated with the identified predefined symbol phase as the demodulated current symbol 418.

The subtractor 406 subtracts the phase of the demodulated current symbol 418 from the phase of the current symbol 312 to generate a phase error signal 322. It is noted that the phase of the current symbol 312 is the phase of the current symbol prior to demodulation. The phase of the demodulated current symbol 418 is phase of the current symbol after demodulation (i.e., the predefined symbol phase that was deemed to be closest to the phase of the current symbol 312). The phase error signal 322 is provided to the low pass filter 408 and to the symbol error detector 110. The low pass filter 408 varies the phase reference 414 in accordance with the phase error signal 322 to further track the phase imperfections based on phase error signal 322. The low pass filter 408 can filter out any transient components of the phase error signal 322 and can retain any long-term effects such as frequency drifts and constant phase offset. The symbol error detector 110 calculates an absolute value of the phase error signal 322. The symbol error detector 110 then compares the absolute value of the phase error signal 322 to a predetermined phase error threshold. The symbol error detector 110 generates a symbol error notification 422 if it is determined that the absolute value of the phase error signal 322 is greater than the predetermined phase error threshold. The symbol error detector 110 can provide the symbol error notification 422 to a Bluetooth link controller or to another processing unit. On receiving the symbol error notification 422, the Bluetooth link controller can discard the Bluetooth EDR packet that comprises the demodulated current symbol 418 and can request retransmission of the Bluetooth EDR packet.

Figure 5:
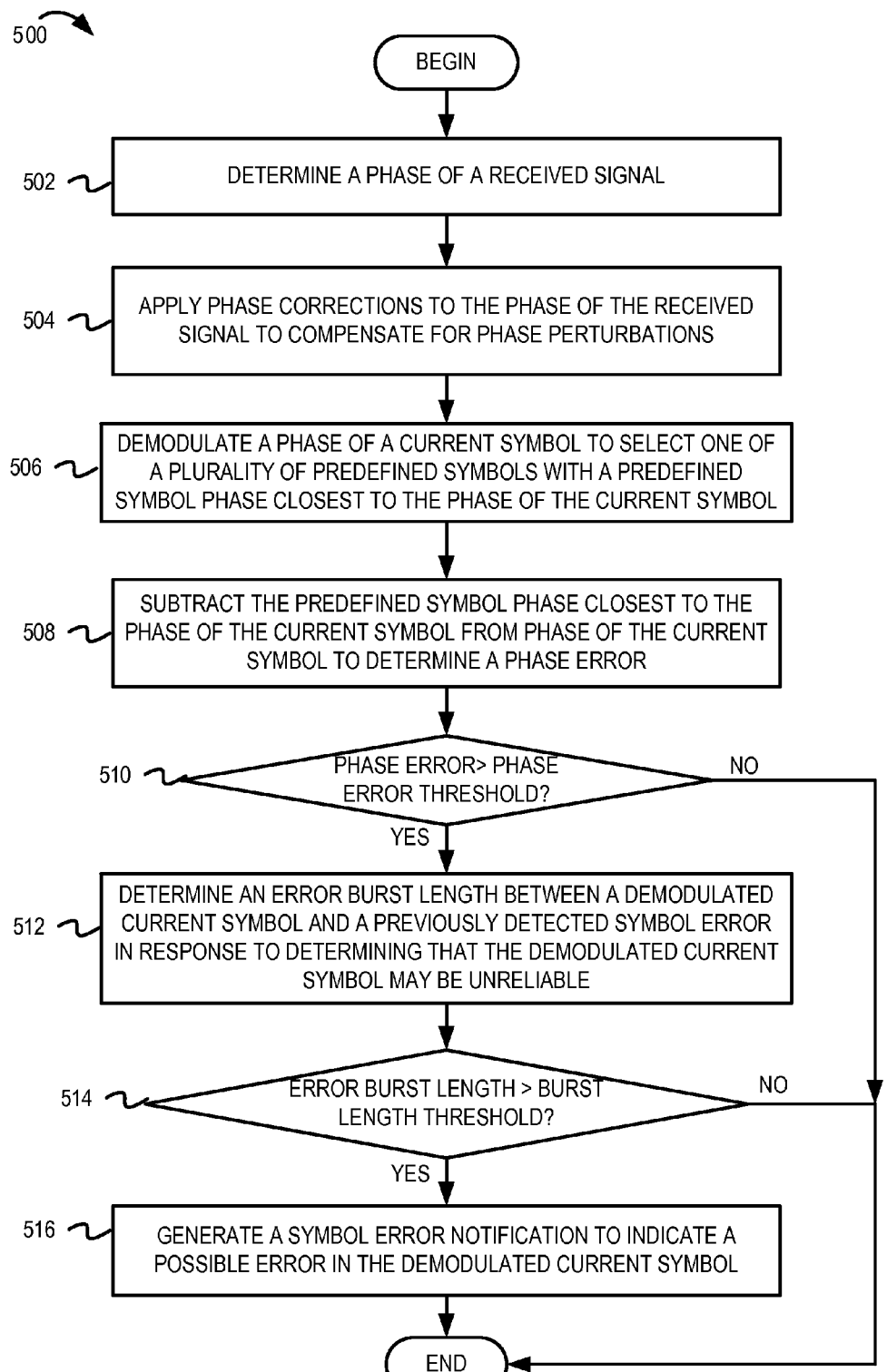
FIG. 5 is a flow diagram illustrating example operations for detecting symbol errors in Bluetooth EDR packets.

FIG. 5 is a flow diagram illustrating example operations for detecting symbol errors in Bluetooth EDR packets. Flow 500 begins at block 502.

At block 502, a phase of a received signal is determined. A payload of a Bluetooth EDR packet is modulated using either a π/4-DQPSK modulation scheme or an 8-DPSK modulation scheme. In either of the DPSK modulation schemes, information is represented by phase variations of the received signal. In other words, the phase of the received signal during a time interval that corresponds to a current symbol ("phase of the current symbol") indicates one of multiple predefined symbols to which the current symbol corresponds. In one implementation, the phase of the current symbol may be determined by a CORDIC in the phase, frequency, and timing acquisition unit 104 of FIG. 1. It is noted, however, that in other implementations other suitable phase tracking mechanism (e.g., a phase locked loop) can determine the phase of the current symbol. The flow continues at block 504

At block 504, phase corrections are applied to the phase of the received signal to compensate for phase perturbations. In the example of FIG. 4, the subtractor 402 subtracts the phase reference 414 generated by the low pass filter 408 from the phase of the received signal to compensate for phase perturbations. In addition to indicating the phase of the current symbol, the phase of the received signal also comprises carrier drifts, fixed phase offsets, and other perturbations to the phase of the current symbol. The low pass filter 408 enables tracking of variations in phase, frequency, or other derivatives of the phase of the current symbol. The phase reference 414 is generated by the low pass filter 408 to enable the symbol demodulator 108 of FIG. 4 to lock onto the phase of the current symbol and to decode the current symbol accurately. The phase reference 414 is generated based on knowledge of a frequency offset 412, an initial phase offset 416, and a phase error associated with a previously demodulated symbol. The flow continues at block 506.

At block 506, the phase of the current symbol is demodulated to select one of a plurality of predefined symbols with a predefined symbol phase closest to the phase of the current symbol. For example, the symbol demodulator 108 demodulates the phase of the current symbol by identifying the predefined symbol phase that closest to the phase of the current symbol. The symbol demodulator 108 can identify the predefined symbol phase closest to the phase of the current symbol by determining symbol boundaries within which the phase of the current symbol lies. For example, referring to FIG. 3, the phase of the current symbol 312 lies within the symbol boundaries 314 and 316 associated with the predefined symbol 310. Therefore, the symbol demodulator 108 maps the current symbol 312 to the symbol 310. The symbol demodulator 108 designates the predefined symbol associated with the predefined symbol phase that is closest to the phase of the current symbol as the demodulated current symbol.

The symbol boundaries may be determined based on knowledge of modulation scheme applied at a transmitter. For example, a DQPSK modulation scheme comprises four predefined symbol phases (e.g., 0, π/2, π, and −π/2). Accordingly, the symbol boundaries for the predefined symbol phase 0 are located at π/4 and −π/4. The symbol boundaries for the predefined symbol phase π/2 are located at π/4 and 3π/4, and so on. As another example, an 8-DPSK modulation scheme comprises eight predefined symbol phases (e.g., 0, π/4, π/2, 3π/4, π, −3π/4, −π/2, and −π/4). Accordingly, the symbol boundaries for the predefined symbol phase 0 are located at π/8 and −π/8. The symbol boundaries for the predefined symbol phase π/4 are located at π/8 and 3π/8, and so on. The flow continues at block 508.

At block 508, the predefined symbol phase that is closest to the phase of the current symbol is subtracted from the phase of the current symbol to determine a phase error. For example, the subtractor 406 subtracts the predefined symbol phase that is closest to the phase of the current symbol from the phase of the current symbol to determine the phase error. The predefined symbol phase that is closest to the phase of the current symbol is the phase of the demodulated current symbol while the phase of the current symbol is the phase of the current symbol prior to demodulation. In other words, the subtractor 406 determines the difference between the phase at the input of the symbol demodulator 108 and the phase at the output of the symbol demodulator 108. The phase error indicates the reliability of the demodulated current symbol. The phase error also indicates the proximity of the phase of the current symbol to a symbol boundary associated with the predefined symbol to which the current symbol was mapped. The symbol error detector 110 can determine an absolute value of the phase error or a squared magnitude of the phase error. The phase error detector 110 can then compare the absolute value (or the squared magnitude) of the phase error to a predetermined phase error threshold, as will be described below. The flow continues at block 510. It is also understood that although not depicted in FIG. 5, the phase error (determined at block 508) may also be provided to the low pass filter 408 of FIG. 4. The low pass filter 408 can filter the phase error and remove transient imperfections. The low pass filter 408 can vary the phase corrections (applied at block 504) based on the phase error. As was described with reference to block 504, the phase corrections can be used to compensate for frequency and phase perturbations in the phase of the received signal.

At block 510, it is determined whether the phase error is greater than the phase error threshold. For example, the symbol error detector 110 of FIG. 4 determines whether the phase error is greater than the phase error threshold. The phase error being greater than the phase error threshold indicates that the phase of the current symbol is close to a symbol boundary between two consecutive predefined symbol phases and, therefore, that the demodulated current symbol may not be accurate. For example, referring to the constellation diagram 320 of FIG. 3, determining that the phase error 322 is greater than the phase error threshold 324 can indicate that the phase of the current symbol 312 is so close to the symbol boundary (in this case the symbol boundary 314) that it can be deemed unreliable because the current symbol has the potential to map to either the predefined symbol 310 or to the predefined symbol 304. Thus, determining that the phase error is greater than the phase error threshold can indicate that the demodulated current symbol may be unreliable. In some implementations, if it is determined that the demodulated current symbol may be unreliable, a symbol error notification may be provided to a Bluetooth link controller. In this case, operations for determining an error burst length, which will be described in blocks 512 and 514, may not be performed. In other implementations, the operations for determining the error burst length may be performed to determine whether to transmit the symbol error notification to the Bluetooth link controller.

The phase error threshold can be determined based on knowledge of an acceptable signal noise ratio (SNR), a minimum error detection probability, a maximum acceptable probability of not detecting the symbol error, and knowledge of the communication channel. For example, for an additive white Gaussian noise (AWGN) channel, Eq. 1 and Eq. 2 can be solved to determine the phase error thresholds.

$$P(|\varphi_{in(n)}| > thresh) \sim 2Q(\sqrt{2SNR}\sin(\varphi_{thresh})) \quad \text{Eq. 1}$$

$$P_{miss} = P\left(|\varphi_{in(n)}| > \frac{2\pi}{M} - \varphi_{thresh}\right) \sim 2Q\left(\sqrt{2SNR}\sin\left(\frac{2\pi}{M} - \varphi_{thresh}\right)\right) \quad \text{Eq. 2}$$

$$\text{where, } Q(x) = \frac{1}{\sqrt{2\pi}}\int_{x=t}^{\infty} e^{\frac{-t^2}{2}} dt,$$

and M=8 for 8-DPSK modulated signals.

As an example, if it is determined that a signal-to-noise ratio (SNR) is 21 dB and 8-DPSK modulated packets with a payload of 2700 symbols are received, the average probability of receiving packets with undetected symbol errors ($P_{miss}$) can be calculated to be 3.4E-06 with a phase threshold ($\phi_{thresh}$) of 0.125π. If a phase threshold of 0.09π (instead of 0.125π) is applied, the probability of receiving packets with undetected symbol errors ($P_{miss}$) would reduce to 5.7E-11, while the probability of a false alarm would only be 0.026. If it is determined that the phase error is greater than the phase error threshold, the flow continues at block 512. If it is determined that the phase error is less than the phase error threshold, the current symbol is deemed to be reliably demodulated and the flow ends.

At block 512, in response to determining that the demodulated current symbol may be unreliable, an error burst length between the demodulated current symbol and a previously detected symbol error is calculated. In addition to detecting a potential symbol error, the symbol error detector 110 can also determine when a symbol error was last detected in the Bluetooth EDR packet. The symbol error detector 110 calculates the error burst length as the number of symbols between the previously detected symbol error and the demodulated current symbol (i.e., a potential current symbol error) in the payload of the Bluetooth EDR packet (endpoints inclusive). The flow continues at block 514.

At block 514, it is determined whether the error burst length is greater than a burst length threshold. For example, the symbol error detector 110 determines whether the error burst length is greater than the burst length threshold. The burst length threshold indicates a minimum number of symbols between successive symbol errors that will cause an erroneously demodulated symbol to pass through to subsequent processing units without detection (e.g., by a CRC error detection mechanism). Comparing the error burst length to the burst length threshold can be used to improve the false alarm rate of the symbol detector 106, rather than relying solely on capabilities of a CRC error detection mechanism. In some implementations, the burst length threshold can be set to catch errors that might not be detected by the CRC error detection mechanism. For example, the CRC-16 error detection mechanism may be able to accurately detect symbol errors that are less than 16 bits (i.e., 8 symbols for a DQPSK modulation scheme and about 5 symbols for an 8-DPSK modulation scheme) apart. The burst length threshold may be set accordingly to catch errors that might not be detected by the CRC-16 error detection mechanism. If it is determined that the error burst length is greater than the burst length threshold, the flow continues at block 516. Otherwise, the flow ends.

At block 516, a symbol error notification is generated to indicate a possible error in the demodulated current symbol. For example, the symbol error detector 110 generates the symbol error notification 422 to indicate a possible error in demodulating the current symbol. The symbol error notification 422 may be provided to the symbol demodulator 108 which, in turn, may prevent transmission of the demodulated current symbol to subsequent processing units (e.g., a Bluetooth link controller). Also, the symbol error notification 422 may be provided to the subsequent processing units. The subsequent processing units can discard the demodulated current symbol and the Bluetooth EDR packet and can request retransmission of the discarded Bluetooth EDR packet. From block 516, the flow ends.

It should be understood that the depicted diagrams (FIGS. 1 through 5) are examples meant to aid in understanding embodiments and should not be used to limit embodiments or limit scope of the claims. Embodiments may perform additional operations, fewer operations, operations in a different order, operations in parallel, and some operations differently. For instance, although FIG. 5 describes the symbol error detector 110 determining the error burst length and generating the symbol error notification if the error burst length is greater than the burst length threshold (blocks 512-516), embodiments are not so limited. In some implementations, the symbol error detector 110 may not determine the error burst length. Instead, the symbol error detector 110 may generate the symbol error notification on detecting the symbol error irrespective of whether or not the error burst length is small enough to enable detection of the symbol error during CRC error detection. In some implementations, the symbol error detector 110 may not generate the symbol error notification if the error burst length is less than the burst length threshold. The symbol error detector 110 may not provide the symbol error notification to the Bluetooth link controller if the symbol error detector 110 determines that the error burst length is less than the burst length threshold and may rely on the CRC error detection mechanism to detect the symbol error.

It is also noted that although FIGS. 1-5 depict the symbol error detector 110 calculating an absolute value of the phase error signal (e.g., the phase error signal 322 of FIG. 3), embodiments are not so limited. In other implementations, the symbol error detector 110 may calculate a squared magnitude of the phase error signal 322, compare the squared magnitude of the phase error signal 322 against an appropriate phase error threshold, and determine whether to generate the symbol error notification 422.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
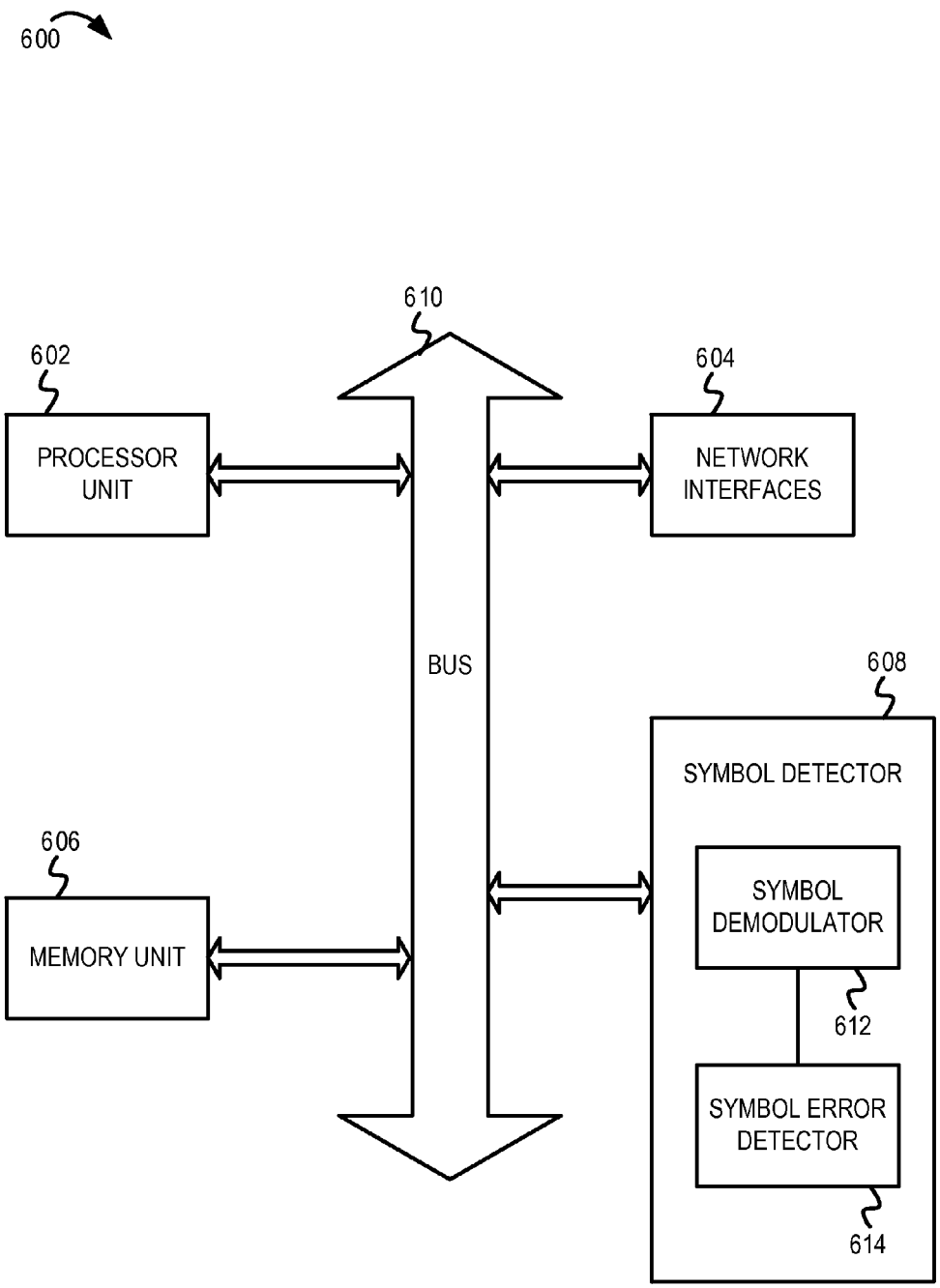
FIG. 6 is a block diagram of one embodiment of a wireless network device including a symbol error detection mechanism.

FIG. 6 is a block diagram of one embodiment of a wireless network device 600 including a symbol error detection mechanism. In some implementations, the wireless network device 600 may comprise a Bluetooth integrated circuit (IC), or both a Bluetooth IC and a WLAN IC. The wireless network device 600 may be embedded in another electronic device (e.g., a personal computer (PC), a laptop, a netbook, a mobile phone, a personal digital assistant (PDA), or other electronic system). The wireless network device 600 includes a processor unit 602 (possibly including multiple processors, multiple cores, multiple nodes, and/or implementing multi-threading, etc.). The wireless network device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The wireless network device 600 also includes a bus 610 (e.g., PCI, ISA, PCI-Express, Hyper-Transport®, InfiniBand®, NuBus, etc.), and network interfaces 604 that include at least one wireless network interface (e.g., a WLAN interface, a Bluetooth® interface, a WiMAX interface, a ZigBee® interface, a Wireless USB interface, etc.).

The wireless network device 600 also comprises a symbol detector 608. The symbol detector 608 comprises a symbol demodulator 612 coupled to a symbol error detector 614. The symbol detector 608 performs operations for detecting symbol errors in DPSK modulated portions of a Bluetooth EDR packet, as described above with reference to FIGS. 1-5. Any one of these functionalities may be partially (or entirely) implemented in hardware and/or on the processing unit 602. For example, the functionality may be implemented with an application specific integrated circuit, in logic implemented in the processing unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the storage device(s), and the network interface 604 are coupled to the bus 610. Although illustrated as being coupled to the bus 610, the memory 606 may be coupled to the processor unit 602.

While the embodiments are described with reference to various implementations and exploitations, it will be understood that these embodiments are illustrative and that the scope of the inventive subject matter is not limited to them. In general, techniques for symbol error detection for Bluetooth enhanced data rate packets as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, at a wireless network device, a phase of a first symbol of a received signal;
   determining that the phase of the first symbol is within a symbol phase boundary of a predefined symbol;
   determining a phase error that indicates a difference between the phase of the first symbol and a phase of the predefined symbol;
   comparing the phase error to a phase error threshold; and
   determining whether to generate a symbol error notification based on said comparing the phase error to the phase error threshold.

2. The method of claim 1, wherein said determining the phase error comprises:
   determining an absolute value of the difference between the phase of the first symbol and the phase of the predefined symbol, or
   determining a squared magnitude of the difference between the phase of the first symbol and the phase of the predefined symbol.

3. The method of claim 1, further comprising:
   determining that the phase error is greater than the phase error threshold;
   determining a number of symbols between a current symbol error and a previously detected symbol error, wherein the current symbol error is associated with the first symbol of the received signal;
   comparing the number of symbols between the current symbol error and the previously detected symbol error to a burst length threshold, wherein the burst length threshold indicates a minimum number of symbols between two consecutive symbol errors that will cause an erroneously demodulated symbol to be undetected; and
   generating the symbol error notification in response to determining that
     the phase error is greater than the phase error threshold, and
     the number of symbols between the current symbol error and the previously detected symbol error is greater than the burst length threshold.

4. The method of claim 3, further comprising discarding the first symbol based, at least in part, on determining that
   the phase error is greater than the phase error threshold and the number of symbols, and
   the previously detected symbol error is greater than the burst length threshold.

5. The method of claim 1, wherein said determining that the phase of the first symbol is within the symbol phase boundary of the predefined symbol comprises:
   comparing the phase of the first symbol with symbol phase boundaries associated with a plurality of phases of a plurality of predefined symbols.

6. The method of claim 5, further comprising:
   mapping the first symbol to a first of the plurality of predefined symbols associated with a first of the plurality of phases, wherein
     said mapping the first symbol is based on determining that the phase of the first symbol lies within symbol phase boundaries associated with the first of the plurality of phases.

7. The method of claim 1, further comprising, for a second symbol of the received signal:
   determining, at the wireless network device, a phase of the second symbol;
   determining that the phase of the second symbol is within the symbol phase boundary of the predefined symbol;
   determining a second phase error that indicates a difference between the phase of the second symbol and the phase of the predefined symbol;
   determining whether the second phase error is greater than the phase error threshold; and
   generating a second symbol error notification in response to determining that the second phase error is greater than the phase error threshold.

8. The method of claim 1, further comprising applying a phase correction to the phase of the first symbol, wherein
   the phase correction is determined, at least in part, on a frequency offset and a phase offset associated with a packet that comprises the first symbol.

9. The method of claim 8, further comprising recalculating the phase correction based, at least in part, on the phase error.

10. The method of claim 1, further comprising discarding the first symbol and a packet that comprises the first symbol based, at least in part, on determining that the phase error is greater than the phase error threshold.

11. The method of claim 1, wherein the received signal is modulated using,
   π/4 rotated differential encoded quadrature phase shift keying (π/4 DQPSK), or
   8-phase differential encoded phase shift keying (8-DPSK).

12. The method of claim 1, further comprising:
   demodulating the first symbol to the predefined symbol based on said determining that the phase of the first symbol is within the symbol phase boundary of the predefined symbol.

13. The method of claim 12, wherein said demodulating the first symbol to the predefined symbol comprises:
   determining that the phase of the first symbol lies within symbol phase boundaries associated with the phase of the predefined symbol; and
   mapping the first symbol to the predefined symbol in response to said determining that the phase of the first symbol lies within the symbol phase boundaries associated with the phase of the predefined symbol.

14. The method of claim 1, further comprising generating the symbol error notification in response to determining that the phase error is greater than the phase error threshold.

15. The method of claim 1, wherein the wireless network device is configured to implement at least one member in a group consisting of,
   a Bluetooth communication protocol, and
   a wireless local area network (WLAN) communication protocol.

16. A wireless network device comprising:
   a processor;
   a receiver unit coupled with the processor, the receiver unit operable to:
     determine a phase of a first symbol of a received signal;
     determine that the phase of the first symbol is within a symbol phase boundary of a predefined symbol;
     determine a phase error that indicates a difference between the phase of the first symbol and a phase of the predefined symbol;
     compare the phase error with a phase error threshold; and
     determine whether to generate a symbol error notification based on comparing the phase error with the phase error threshold.

17. The wireless network device of claim 16, wherein the receiver unit operable to determine the phase error further comprises the receiver unit operable to:

determine an absolute value of the difference between the phase of the first symbol and the phase of the predefined symbol, or determine a squared magnitude of the difference between the phase of the first symbol and the phase of the predefined symbol.

18. The wireless network device of claim 16, wherein the receiver unit is further operable to:

determine that the phase error is greater than the phase error threshold;

determine a number of symbols between a current symbol error and a previously detected symbol error, wherein the current symbol error is associated with the first symbol of the received signal;

compare the number of symbols between the current symbol error and the previously detected symbol error to a burst length threshold, wherein the burst length threshold indicates a minimum number of symbols between two consecutive symbol errors that will cause an erroneously demodulated symbol to be undetected; and generate the symbol error notification in response to the receiver unit determining that the phase error is greater than the phase error threshold, and the number of symbols between the current symbol error and the previously detected symbol error is greater than the burst length threshold.

19. The wireless network device of claim 18, wherein the receiver unit is further operable to discard the first symbol based, at least in part, on determining that the phase error is greater than the phase error threshold and the number of symbols, and the previously detected symbol error is greater than the burst length threshold.

20. The wireless network device of claim 16, wherein the receiver unit is further operable to discard the first symbol and a packet that comprises the first symbol in response to determining that the phase error is greater than the phase error threshold.

21. The wireless network device of claim 16, wherein the receiver unit is operable to:

compare the phase of the first symbol with symbol phase boundaries associated with a plurality of phases of a plurality of predefined symbols; and map the first symbol to a first of the plurality of predefined symbols associated with a first of the plurality of phases of the plurality of predefined symbols, wherein the receiver unit is operable to map the first symbol based on determining that the phase of the first symbol lies within symbol phase boundaries associated with the first of the plurality of phases.

22. The wireless network device of claim 16, wherein the receiver unit is further operable to apply a phase correction to the phase of the first symbol, wherein the phase correction is determined, at least in part, on the phase error.

23. The wireless network device of claim 22, wherein the receiver unit is further operable to recalculate the phase correction based, at least in part, on the phase error.

24. The wireless network device of claim 16, wherein the received signal is modulated using, $\pi/4$ rotated differential encoded quadrature phase shift keying ($\pi/4$ DQPSK), or 8-phase differential encoded phase shift keying (8-DPSK).

25. The wireless network device of claim 16, wherein the receiver unit is further operable to:

demodulate the first symbol to the predefined symbol based on determining that the phase of the first symbol is within the symbol phase boundary of the predefined symbol.

26. The wireless network device of claim 25, wherein the receiver unit operable to demodulate the first symbol comprises the receiver unit operable to:

determine that the phase of the first symbol lies within symbol phase boundaries associated with the phase of the predefined symbol; and map the first symbol to the predefined symbol in response to determining that the phase of the first symbol lies within the symbol phase boundaries associated with the phase of the predefined symbol.

27. The wireless network device of claim 16, wherein the receiver unit is further operable to generate the symbol error notification in response to determining that the phase error is greater than the phase error threshold.

28. The wireless network device of claim 16, wherein the wireless network device is configured to implement at least one member in a group consisting of, a Bluetooth communication protocol, and a wireless local area network (WLAN) communication protocol.

29. A non-transitory machine-readable storage medium, having instructions stored therein, which, when executed by a processor causes the processor to perform operations that comprise:

determining a phase of a first symbol of a received signal;

determining that the phase of the first symbol is within a symbol phase boundary of a predefined symbol;

determining a phase error that indicates a difference between the phase of the first symbol and a phase of the predefined symbol;

comparing the phase error to a phase error threshold; and determining whether to generate a symbol error notification based on comparing the phase error to the phase error threshold.

30. The non-transitory machine-readable storage medium of claim 29, wherein said operation of determining the phase error comprises:

determining an absolute value of the difference between the phase of the first symbol and the phase of the predefined symbol, or determining a squared magnitude of the difference between the phase of the first symbol and the phase of the predefined symbol.

31. The non-transitory machine-readable storage medium of claim 29, wherein the operations further comprise:

determining that the phase error is greater than the phase error threshold;

determining a number of symbols between a current symbol error and a previously detected symbol error, wherein the current symbol error is associated with the first symbol of the received signal;

comparing the number of symbols between the current symbol error and the previously detected symbol error to a burst length threshold, wherein the burst length threshold indicates a minimum number of symbols between two consecutive symbol errors that will cause an erroneously demodulated symbol to be undetected; and generating the symbol error notification in response to determining that the phase error is greater than the phase error threshold, and the number of symbols between the current symbol error and the previously detected symbol error is greater than the burst length threshold.

32. The non-transitory machine-readable storage medium of claim 31, wherein the operations further comprise:
discarding the first symbol based, at least in part, on determining that
the phase error is greater than the phase error threshold and the number of symbols, and
the previously detected symbol error is greater than the burst length threshold.

33. The non-transitory machine-readable storage medium of claim 29, wherein the operations comprise:
comparing the phase of the first symbol with symbol phase boundaries associated with a plurality of phases of a plurality of predefined symbols; and
mapping the first symbol to a first of the plurality of predefined symbols associated with a first of the plurality of phases, wherein
said mapping the first symbol is based on determining that the phase of the first symbol lies within symbol phase boundaries associated with the first of the plurality of phases.

34. The non-transitory machine-readable storage medium of claim 29, wherein the operations further comprise discarding the first symbol and a packet that comprises the first symbol in response to determining that the phase error is greater than the phase error threshold.

35. The non-transitory machine-readable storage medium of claim 29, wherein the operations further comprise applying a phase correction to the phase of the first symbol, wherein
the phase correction is determined, at least in part, on the phase error.

36. The non-transitory machine-readable storage medium of claim 35, wherein the operations further comprise recalculating the phase correction based, at least in part, on the phase error.

37. The non-transitory machine-readable storage medium of claim 29, wherein the operations further comprise:
demodulating the first symbol to the phase of the first symbol is within the symbol phase boundary of the predefined symbol.

38. The non-transitory machine-readable storage medium of claim 37, wherein said operation of demodulating the first symbol to the predefined symbol comprises:
determining that the phase of the first symbol lies within symbol phase boundaries associated with the phase of the predefined symbol; and
mapping the first symbol to the predefined symbol in response to said determining that the phase of the first symbol lies within the symbol phase boundaries associated with the phase of the predefined symbol.

39. The non-transitory machine-readable storage medium of claim 29, wherein the operations further comprise generating the symbol error notification in response to determining that the phase error is greater than the phase error threshold.

* * * * *